Aug. 30, 1949.  M. E. COLLIS  2,480,286
TOWER-TYPE AIR-CONDITIONING APPARATUS
Filed June 15, 1948  2 Sheets-Sheet 1

INVENTOR.
MARTIN E. COLLIS,
BY
McMorrow, Berman & Davidson
ATTORNEYS.

Aug. 30, 1949.　　　　　M. E. COLLIS　　　　2,480,286
TOWER-TYPE AIR-CONDITIONING APPARATUS
Filed June 15, 1948　　　　　　　　　　　　2 Sheets-Sheet 2

INVENTOR.
MARTIN E. COLLIS,
BY
McMorrow, Berman & Davidson
ATTORNEYS.

Patented Aug. 30, 1949

2,480,286

UNITED STATES PATENT OFFICE 2,480,286

TOWER-TYPE AIR-CONDITIONING APPARATUS

Martin E. Collis, Houston, Tex.

Application June 15, 1948, Serial No. 33,015

6 Claims. (Cl. 62—139)

This invention relates to air-conditioning, and refers particularly to a special means for supplying cool and humid air.

The main object of my invention is to provide special and very effective means for supplying adequate amounts of cooled air at low cost for operation and maintenance.

Another object is to provide a tower-type air-conditioning apparatus which may be termed a cooling tower in which the tower is open on all four sides and has a plurality of groups of water-cooling pipes having loops disposed transversely to each other among the groups to provide maximum heat exchange surface in the apparatus.

A further object is to have such a tower-type air-conditioning apparatus which has facilities for supplying large quantities of filtered dry air and humidified air at given temperatures.

A still further object is to have such a tower-type air-conditioning apparatus wherein the groups of water-cooling pipes are exposed to spraying by water which is introduced at the top of the tower and the latter provided with groups of inwardly-inclined louvers past which air is drawn in to constitute an air supply for the apparatus and simultaneously prevent the water spray from escaping from the tower.

It is also an object to provide such air-conditioning apparatus with control means for regulating the temperature and amount of humidity of the air delivered by the apparatus.

An object of the invention is likewise to provide a tower air-cooling apparatus which is reasonable in cost, convenient to operate, simple and durable in construction, adapted for use in any location in this country, and as readily installed on a farm or ranch, as in a city home, and requiring only to be supplied with water and electricity.

Other objects and advantages of my invention will become apparent upon a careful perusal of the following specification taken together with the accompanying drawings forming part hereof, and in which.

In the various views, the same reference numerals indicate the same or like parts.

Figure 1:
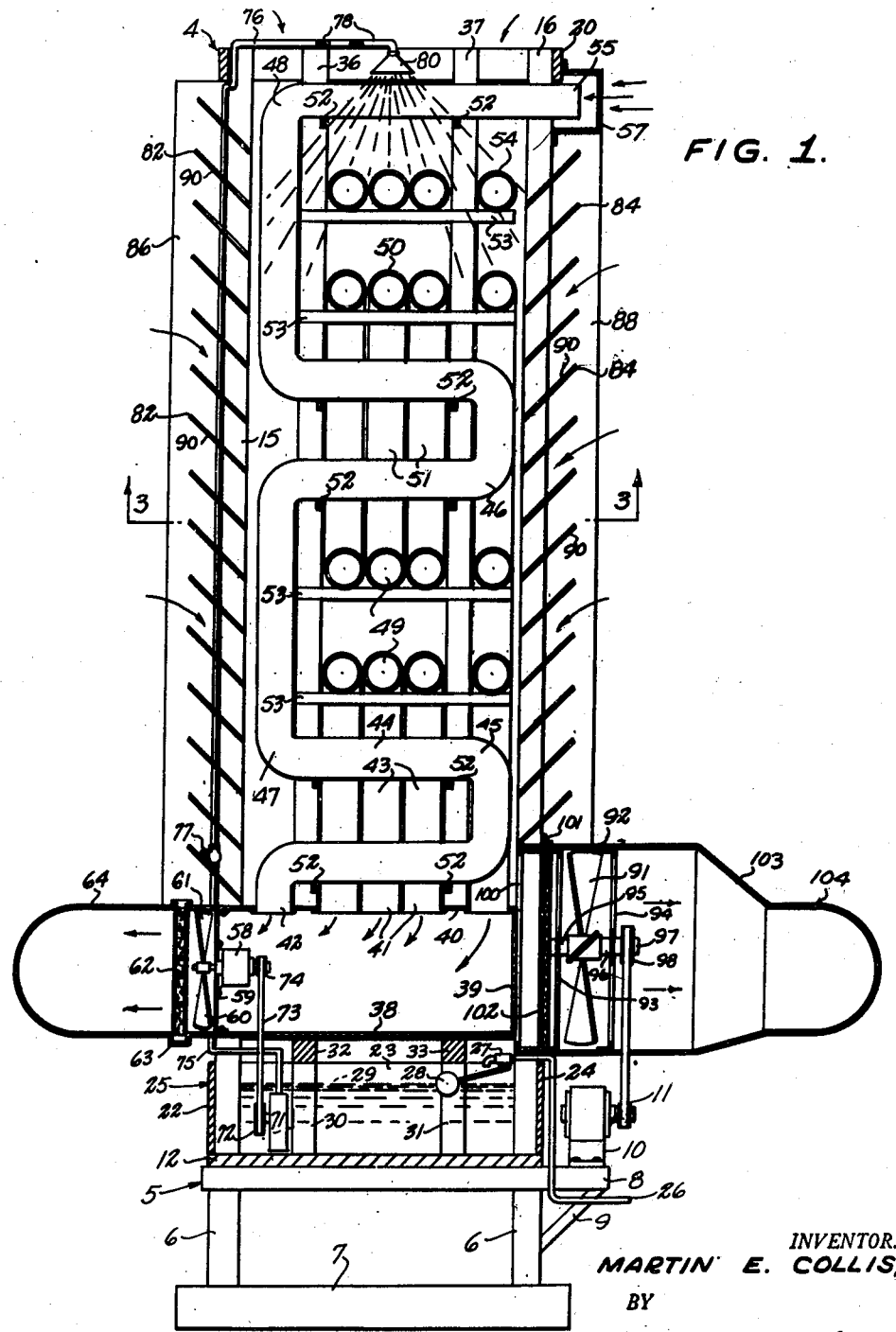
Figure 1 is a vertical section of a tower-type air-conditioning apparatus made according to the invention and embodying the same in practical form, the section being taken on line 1—1 in Figure 2.
Figure 2:
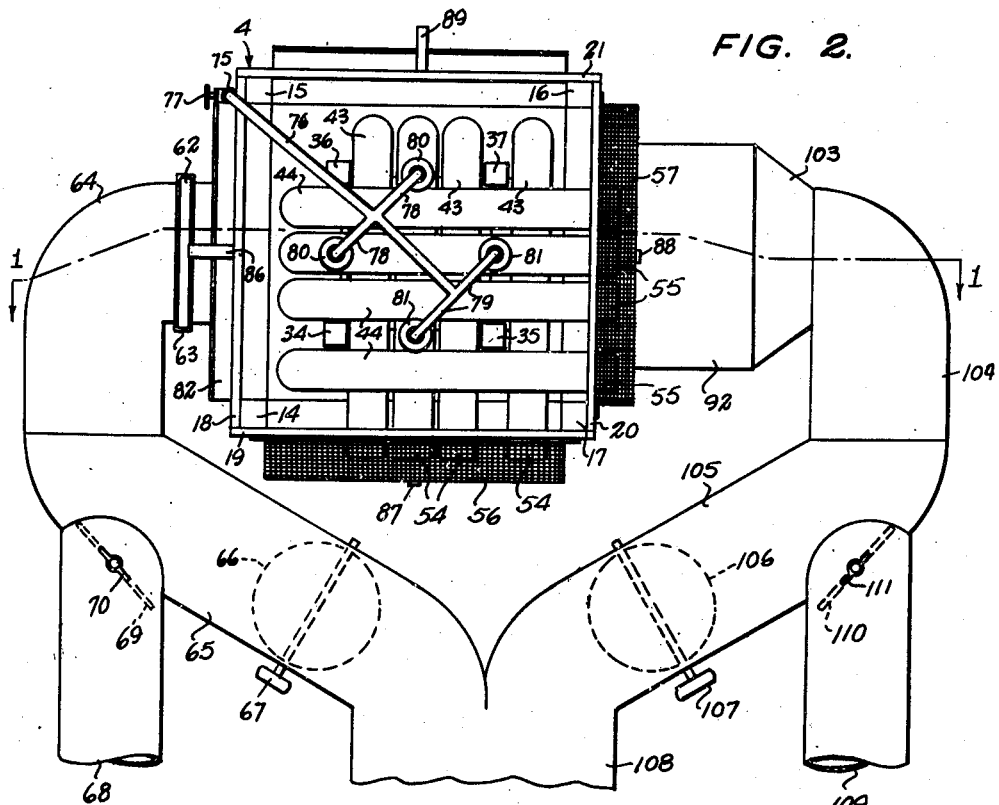
Figure 2 is a plan view of the apparatus of Figure 1.
Figure 3:
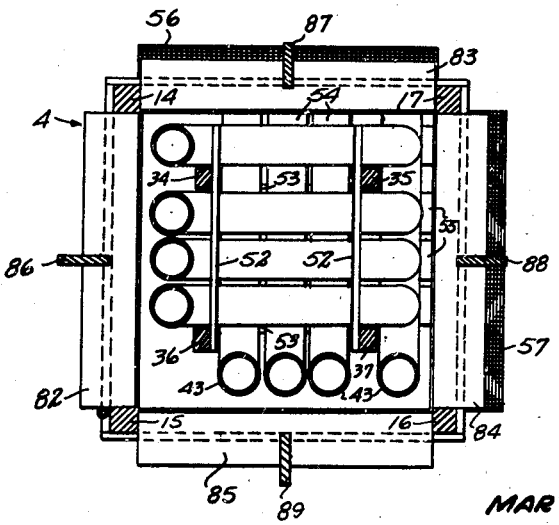
Figure 3 is a transverse section of the apparatus as taken on line 3—3 of Figure 1.

In this modern age air-conditioning is rapidly becoming a necessity, and for this reason it becomes important to provide economical, simple and yet effective means for controlling the temperature and humidity of the air in homes, stores, plants and the like, in order to provide uniform conditions and thereby improve living and working conditions generally. Apparatus heretofore provided for such purposes have been expensive, far from simple, neither convenient nor reasonable to operate, and frequently likely to wear out or get out of order.

After considering this problem, in order to eliminate the enumerated disadvantages, and particularly with the foregoing and other objects in view, I have designed a special form of effective air-conditioning apparatus, which will now be particularly described in detail.

Hence, referring again to the drawings and in the practice of my invention, an air-conditioning and humidifying tower generally indicated at 4 is built up on a supporting base 5 which in turn is supported by four corner posts 6, 6, etc., resting on a foundation base 7 which in turn may rest directly upon a concrete floor or upon the floor of a house. On the other hand, the base 5 may itself be the main base of the entire apparatus and lie directly upon the floor, if so desired, and in some cases this may be quite practical. However, in the drawings, the base 5 is shown as a platform having a projection 8 further supported by one or more braces 9 for supporting a motor 10 provided with a pulley 11 for driving a fan, as will be further explained.

Upon the platform 5 is located a wooden floor 12 upon which are disposed four vertically-projecting uprights 14, 15, 16 and 17, the upper ends means of screws or bolts or any other means of four strips of wood or other material 18, 19, 20 and 21 upon the outer sides of the posts by means of screws or bolts or any other means known in the art. About the lower ends of the same posts are fixed plates or boards 22, 23, 24, etc., which are very tightly fitted to the posts and to the floor or bottom 12 to form a water tank serving as a reservoir from which the water supply in the apparatus is to be taken. Of course, a metal tank or other equivalent container may be utilized instead, if desired. However, in order to supply the mentioned tank, which may be generally indicated at 25, with water, a supply pipe 26 is brought up over the edge of one bounding wall 24 and provided with a valve 27 controlled by float 28 serving to maintain the water 29 at substantially a uniform level within the tank.

Before following through the raising of the water and spraying of the same from the upper portion of the tower, it may be well to consider the internal structure of the latter. Within the tank 25 and resting upon the bottom 12 thereof are a group of posts 30, 31, etc., supporting the ends of a pair of crossbeams 32, 33 which serve a double purpose, the first being to support four inner posts or uprights 34, 35, 36, 37, and second, an air reservoir or receiver 38 which has a closed end 39 at the right, while the top 40 has two groups of air-supply tubes extending with their lower open ends 41, 42 through said top in order to discharge air into the air receiver 38 from said tubes. The latter tubes 43 and 44 are grouped several between, and at least one outside of, the last-mentioned corner posts 34 to 37, with two narrow and two wide loops upon each tube, as indicated at 45, 46, 47, 48 on each tube 44, and 49, 50, and only one wide loop 51 on each tube 43. In order to support these loops or convolutions of the two sets of tubes, several pairs of cross-bars 52 are secured to the posts 34 and 36 on one side, and 35 and 37 on the other side to support the loops or convolutions 45, 46, 47 and 48 of tubes 44, while in similar fashion, several groups of supporting cross-bars 53, 53 are mounted transversely with respect to cross-bars 52 upon posts 36 and 37, as well as on posts 34 and 35, to support the convolutions or loops 49, 50 and 51 of tubes 43. The upper portions of tubes 43, 43 terminate as horizontal open ends 54 protruding a short distance outside the outline of the tower as bounded by the upper strips 18, 19, 20, etc., and in similar fashion, the upper portions of tubes 44 terminate in the upper horizontal open ends 55 protruding a short distance beyond the upper strip 20, the upper ends 54 and 55 serving as intake ports for the air to be received into the apparatus and intended to travel through the pipes 43 and 44. In order to prevent dust and dirt, especially large flakes of soot or smoke or other floating materials found in the air, from entering the pipes at their mentioned upper ends, a screen cage 56 is mounted exteriorly upon the tower upon strip 19 in such position as to cover the ends 54 of pipes 44 and thereby force the air traveling toward said upper ends 54 thereof to pass through this screen, and in similar fashion, a second screen cage 57 is mounted upon strip 20 in a position to cover the ends 55 of pipes 44 and thus initially filter the air entering both groups of pipes or tubes. It is thus evident that the air that passes in through the screen cages 56 and 57 enter the ends 54 and 55 of pipes 43 and 44 and will pass down through the convolutions of these air tubes to the lower ends 41 and 42 thereof and enter the air receiver 38. In order to induce the air to travel in the manner described, a motor 58 is mounted upon a bracket 59 in the outer open end of the receiver and beyond the bracket 59 is provided with a fan 60 which, when rotated, will cause the air to travel toward said fan from the tubes 43 and 44, the fan rotating in a projecting end 61 of the receiver and beyond the fan is located a removable filter 62 for finally filtering the air drawn from the tubes toward said filter. The mentioned filter is located in a box 63 from which it may be vertically raised and replaced while beyond said box the pipe 64 conducts the air propelled by fan 60 forwardly to a pipe 65 provided with a damper 66 controlled by an exterior handle 67, while from one side of pipe 65 a branch pipe 68 leads off into an independent direction while being controlled by an internal damper 69 controlled by a handle 70 for leading off excess air to selected rooms or portions of a house or plant, as desired.

The purpose of leading the air in through the tubes 43 and 44 is to cool the same and for this purpose water is sprinkled on the pipes from the top of the tower by raising the water from the tank 25 previously described. In order to effect this result, a pump 71 in or connected to the water tank 25 has a pulley 72 connected by means of a belt 73 to a pulley 74 simultaneously rotated by motor 58 with fan 60, while the pipe 75 leading from pump 71 extends up to the top of the tower and connects with a horizontal distributing pipe 76 to which the water supply is controlled by a valve 77 on pipe 75. The distributing pipe 76 is provided with a plurality of branch pipes 78, 78, 79 terminating in downwardly-directed sprinkler heads 80, 81 spaced a short distance above the uppermost ends 55 of the air tubes. Naturally, when the motor 58 is energized so that the fan 60 rotates, the pulley 74 of this motor will simultaneously cause operation of pump 71 and draw water up through pipe 75 to the sprinkler heads 80 and 81 and cause all of the pipes and their convolutions within the tower to be sprayed with water which will drip down from one loop or convolution to the other to the top 40 of the air receiver 38, upon which the water will accumulate only to run down the side thereof into the tank, provided there is sufficient excess of water remaining after passing over these pipes, some of the water passing beyond the end 39 of the air receiver and again entering the tank immediately above valve 27. The evaporation of the water from the pipes to the air within the tower will tend to cool the air passing down through the pipes, but it is to be noted that the air traveling through the pipes or tubes is completely dry and conducting therethrough wholly out of contact with the water, so that only dry cooled air is received by the receiver 38 and supplied to pipe 65 at the bottom of the apparatus.

Thus far described, the apparatus serves to supply cold dry air, as already mentioned, but in order to avoid the escape or spreading of the water spray emanating from the top of the tower out through the sides of the latter and also in order to give direction to the air intended to cause evaporation of water from the surfaces of the various pipes or tubes within said tower, the open sides of the same are provided with a series of louvers or vanes 82, 83, 84, 85 arranged in vertical series between the four corner posts 14, 15, 16 and 17 with the individual vanes or louvers inwardly inclined downward and the corner posts preferably grooved to receive the ends of the vanes and the latter preferably also having offset shoulders at the ends to form stops against the posts and thereby limit the vanes to positions in which they project into the tower only as far as the inner sides of the posts. In order to support the vanes more effectively, each vertical series of these vanes or louvers is provided with a vertically-arranged intermediate support, as shown at 86, 87, 88, 89, each being formed with inclined slots 90, 90 into which the upper intermediate edges of the vanes or louvers extend, so that the latter are prevented from being bent down or broken off and instead are retained in effective spaced positions with respect to each other. With the louvers or vanes inclined downwardly at their inner edges, it is evident that the spray will tend to gravitate inwardly of the tower and whatever water strikes the louvers will drip off the inner edges thereof and thus retain the water either in fluid form or in a spray within the tower.

In order to make the cooling of the air passing through the tubes 43 and 44 entirely effective and also provide humidified as well as cool air as a product of the apparatus, a second fan 91 is mounted in the fan chamber 92, a pair of frames 93, 94 spaced apart within the fan housing supporting the bearings 95, 96 in which the fan shaft 97 rotates, while upon the outer end of this shaft is mounted a pulley 98 connected by a belt to the previously-mentioned pulley 11 of motor 10 mounted on platform extension 8. The inner open end 100 of the housing 92 is secured between the corner posts 16 and 17 and reinforced in position by a transverse angle member 101 upon the outer sides of said posts, while within the open end just described is located a filter 102 serving to filter the air being withdrawn from the apparatus by fan 91. The outer end of the fan housing 92 has a reduced portion 103 which is connected with a delivery pipe 104 which in turn connects with a forwardly-directed pipe 105 containing a damper 106 controlled by an outside handle 107 and which, together with the previously-described delivery pipe 65, joins with a common delivery pipe 108 which is directed and led to the chambers or plant space to be air-conditioned.

The arrangement is such that the air which enters the upper ends 54 and 55 of the interior air tubes 43 and 44 previously described remains in dry condition as it passes down through these tubes, while the latter are cooled by the spray of water sprinkled thereon by the sprinkler heads 80, 81, this cooled dry air being led through delivery pipe 65 to the general delivery pipe 108, while on the other hand, a large quantity of air is drawn by fan 91 in through all four sides of the tower past the louvers 82, 83, 84, 85 against all the surfaces of the air pipes 43 and 44 to hasten evaporation of water from these surfaces and at the same time be cooled by contact with the pipes and drawn into pipe 104 and thence forward through the delivery pipe 105 to the previously-mentioned main delivery pipe 108. The dry cold air from pipe 65 may be united with the humidified cooled air being delivered through pipe 105 to the main pipe 108, but supply of either type of air may be nicely controlled by means of the dampers 66 and 106, so that the resulting delivery of air from pipe 108 may be of equal portions of dry cold and humid cold air, or only partly of one and more of the other, or exclusively of one kind, as desired and according to the adjustment of either or both of the dampers 66 and 106. At the same time, some of the dry cold air may be withdrawn from pipe 65 by at least partly opening damper 69 to withdraw the excess of the dry cold air through pipe 68 after which this withdrawn portion of the air may be directed to any part of the building desired. In the same way that the excess dry cold air may be withdrawn from pipe 65 through auxiliary pipe 68, excess humid cold air may be supplied to various parts or rooms of the building from pipe 105 through auxiliary pipe 109 connected thereto, the flow through the latter being controlled by the damper 110 manipulated by the exteriorly accessible handle 111. Thus, a choice is available of cold dry or cold humid air, even in the excess supply independently of the main supply pipe 108.

From the foregoing description it is evident that the only requirements for operating the apparatus as a whole are water for the tank and electric current for the two fan motors 10 and 58, the water being supplied through pipe 26 and the electric current being obtained from the current mains of the building involved.

While the tower has been described as largely constructed of wood for the posts and supporting cross-bars, as well as the floor of the tank, it is obvious that these parts may also be made of metal if so desired, which is also true of the foundation supporting the tower. In fact, the foundation may be largely omitted and the platform or base 5 substituted by a solid concrete block or the like. In addition, the air tubes 43 and 44 may be made of copper, aluminum, stainless steel or of any metal desired, while the louvers or vanes 82, 83, 84 and 85 may be made of wood, metal or plastic and more or fewer convolutions, if desired, and the grouping may be varied also.

Manifestly, other variations may be resorted to and parts and features may be further modified or used without others within the scope of the appended claims.

Having now fully described my invention, I claim:

1. In a tower-type air-conditioning apparatus comprising a support, supporting means mounted on said support, a water-supply means mounted on the latter, an air receiver also mounted on said support and at least one upwardly-extending and sinuously-formed air tube mounted on the supporting means, the features which include having the air receiver disposed directly above the water-supply means and the lower end of the air tube opening into the air receiver with the upper open end of said air tube exposed upon the upper portion of the apparatus at one side thereof to the atmosphere, there being at least one water sprinkler mounted on the apparatus above the air tube, means for elevating water from the water-supply means to the water sprinkler, an air-delivery pipe connected to the air receiver, means for propelling the air received into the latter from said air tube into said air-delivery pipe adjacent to said air receiver, and means for inducing an inward and downward draft of air about the air tube in order to produce evaporation of sprinkled water from the latter to effect cooling thereof.

2. A tower-type air-conditioning apparatus, including a support, supporting means mounted on the support, a water supply means mounted on the latter, an air receiver also mounted on said support, a plurality of upwardly-extending and sinuously-formed air tubes supported on the supporting means with the lower ends thereof opening into the air receiver and the upper open ends of the air tubes exposed upon the upper portion of the apparatus at one side thereof to the atmosphere, at least one water sprinkler mounted on said apparatus above said air tubes, means for elevating water from the water supply means to the water sprinkler, an air delivery pipe connected to said air receiver, means for propelling the air received into the latter from said air tubes into said air-delivery pipe, a second air-delivery pipe opening inwardly toward the lower external portions of said air tubes independently of said air receiver, a plurality of inwardly-directed air guide means located upon all sides of said apparatus about said air tubes for directing air against the latter when drawn into the apparatus toward the second air pipe, means for propelling the air to the latter from about said air tubes to cool said tubes and produce forced evaporation therefrom, control valves individually disposed in both air-delivery pipes, and a common air-delivery pipe connected to the latter two delivery pipes.

3. A tower-type air-conditioning apparatus, including a base, a group of upright corner posts supported upon the base, a water supply tank located on said base, an air receiver having an air-delivery pipe connected thereto, a motor-driven fan propelling air from the air receiver into the air-delivery pipe, a plurality of upwardly-extending sinuous air tubes located between the corner posts with the lower ends thereof opening into the air receiver and the upper ends thereof opening to the atmosphere at the upper portion of the apparatus between at least two of said corner posts, a vertical series of downwardly and inwardly-inclined vanes or louvers spaced apart and located between each outer pair of corner posts with the ends thereof attached to the sides of the corner posts between which they are located, one or more sprinkler heads located above the upper ends of said air tubes, a pipe connecting with the sprinklers, a driven pump communicating with said pipe and with said water supply tank, a fan housing communicating with the space between the corner posts above said air receiver and having a second air-delivery pipe connected thereto, a motor-driven fan within the fan housing for drawing air in between said louvers about the sinuous air tubes into said fan housing toward said second air-delivery pipe, and a third air-delivery pipe connected to the first-mentioned and second air-delivery pipes, and the latter each having a manually-operated damper for controlling the flow of air through the same.

4. A tower-type air-conditioning apparatus, including a base, a group of upright corner posts supported upon the base, a water supply tank located on said base at the bottom of the posts, bounding members connecting the tops of the latter, a plurality of supports supported on the base, a pair of horizontally-disposed cross-beams resting on said supports, an air receiver located above the cross-beams between said corner posts, a second inner group of upright posts resting with the lower ends thereof on said cross-beams, a plurality of cross-bars fixed upon the last-mentioned posts in mutually transverse arrangement, two groups of sinuous air tubes extending upwardly between the first-mentioned corner posts with the lower ends thereof openings into said air receiver and the upper open ends directed outward from two sides of the upper portion of the apparatus to the atmosphere, two screens covering the upper open ends of the two groups of air tubes for filtering the air entering the latter, the loops or convolutions of one group of the latter being disposed transversely with respect to the loops or convolutions of the other group and both groups having their loops or convolutions supported upon said cross-bars, an air-delivery pipe connected to said air receiver, a rotary fan disposed in the end of the latter for propelling air into the air-delivery pipe, a motor for driving the fan having a pulley, a pump connected to the water supply tank and having a pulley for operating said pump, a belt connecting said pulleys, a plurality of sprinkler heads supported by the bounding means upon the first-mentioned corner posts above said sinuous air tubes, a pipe interconnecting the sprinkler heads with the pump, a vertical series of inwardly and downwardly-inclined vanes or louvers disposed between each pair of said first-mentioned corner posts upon each side of the apparatus with the ends of the vanes supported by the sides of the respectively-adjacent pair of posts between which they are located, an outer elongated upright vane support disposed upon each side of said apparatus having downwardly-inclined slots engaging intermediate portions of the outer edges of the vanes upon each respective side, a fan housing opening into the space between the corner posts above said air receiver and having a second air-delivery pipe connected thereto, a motor-driven fan in the fan housing for drawing air in between said louvers about the sinuous air tubes into said fan housing toward said second air-delivery pipe, a filter disposed between each fan and the respectively-adjacent delivery pipe, and a further air-delivery pipe connected to the first-mentioned and second air-delivery pipes, and the latter each having a manually-operated damper to control delivery of air therethrough.

5. A tower-type air-conditioning apparatus, including a base, a group of upright corner posts supported upon the base, a water supply tank located on said base, an air receiver having an air-delivery pipe connected thereto, a motor-driven fan propelling air from the air receiver into the air-delivery pipe, a plurality of upwardly-extending sinuous air tubes located between the corner posts with the lower ends thereof opening into the air receiver and the upper ends thereof opening to the atmosphere at the upper portion of the apparatus between at least two of said corner posts, a vertical series of downwardly and inwardly-inclined vanes or louvers spaced apart and located between each outer pair of corner posts with the ends thereof attached to the sides of the corner posts between which they are located, one or more sprinkler heads located above the upper ends of said air tubes, a pipe connecting with the sprinklers, a driven pump communicating with said pipe and with said water supply tank, a fan housing communicating with the space between the corner posts above said air receiver and having a second air-delivery pipe connected thereto, a motor-driven fan within the fan housing for drawing air in between said louvers about the sinuous air tubes into said fan housing toward said second air-delivery pipe, a further air-delivery pipe connected to and common to the first-mentioned and second air-delivery pipes, said first-mentioned and second air-delivery pipes each having a manually-operated damper to control delivery of air therethrough, and a branch air-delivery pipe connected to one of the two delivery pipes having a manually-operated damper therein for controlling the delivery of air through said branch air delivery pipe.

6. A tower-type air-conditioning apparatus, including a base, a group of upright corner posts supported upon the base, a water supply tank located on said base, an air receiver having an air-delivery pipe connected thereto, a motor-driven fan propelling air from the air receiver into the air-delivery pipe, a plurality of upwardly-extending sinuous air tubes located between the corner posts with the lower ends thereof opening into the air receiver and the upper ends thereof opening to the atmosphere at the upper portion of the apparatus between at least two of said corner posts, a vertical series of downwardly and inwardly-inclined vanes or louvers spaced apart and located between each outer pair of corner posts with the ends thereof attached to the sides of the corner posts between which they are located, one or more sprinkler heads located above the upper ends of said air tubes, a pipe connecting with the sprinklers, a driven pump communicating with said pipe and with said water supply tank, a fan housing communicating with the space between the corner posts above said air receiver and having a second air-delivery pipe connected thereto, a motor-driven fan within the fan housing for drawing air in between said louvers about the sinuous air tubes into said fan housing toward said second air-delivery pipe, a further air-delivery pipe connected to and common to the first-mentioned and second air-delivery pipes, said first-mentioned and second air-delivery pipes each having a manually-operated damper to control delivery of air therethrough, a branch air-delivery pipe connected to the first-mentioned delivery pipe having a manually-operated damper therein for controlling the delivery of dry cold air through said branch air-delivery pipe, and a second branch air-delivery pipe connected to the second air-delivery pipe and having a manually-operated damper therein for controlling the delivery of humid cold air through said second branch air-delivery pipe.

MARTIN E. COLLIS.

REFERENCES CITED

The following references are of record in the file of this patent:

UNITED STATES PATENTS

| Number | Name | Date |
| --- | --- | --- |
| 1,861,158 | Hilger | May 31, 1932 |
| 2,225,795 | Pernot | Dec. 24, 1940 |
| 2,321,933 | Olstad | June 15, 1943 |